US012560499B2

(12) United States Patent
Schwanitz et al.

(10) Patent No.: US 12,560,499 B2
(45) Date of Patent: Feb. 24, 2026

(54) MEMBRANE DEVICE WITH LAYER STRUCTURE

(71) Applicant: WIKA Alexander Wiegand SE & Co. KG, Klingenberg (DE)

(72) Inventors: Konrad Schwanitz, Aschaffenburg (DE); Michael Zoeller, Klingenberg (DE); Lorenz Kehrer, Grossostheim (DE); Marco Langenschwarz, Moenchberg (DE)

(73) Assignee: Wika Alexander Wiegand SE & Co. KG, Klingenberg (DE)

( * ) Notice: Subject to any disclaimer, the term of this patent is extended or adjusted under 35 U.S.C. 154(b) by 284 days.

(21) Appl. No.: 18/205,194

(22) Filed: Jun. 2, 2023

(65) Prior Publication Data

US 2023/0393003 A1    Dec. 7, 2023

(30) Foreign Application Priority Data

Jun. 3, 2022    (DE) ..................... 10 2022 114 193.4

(51) Int. Cl.
*G01L 9/00* (2006.01)
*G01L 9/04* (2006.01)

(52) U.S. Cl.
CPC .......... *G01L 9/0044* (2013.01); *G01L 9/0058* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12;
(Continued)

(56) References Cited

U.S. PATENT DOCUMENTS 4,975,390 A * 12/1990 Fujii ..................... G01L 9/0055
148/DIG. 135
5,400,655 A    3/1995 Tamal et al.
(Continued)

FOREIGN PATENT DOCUMENTS

CN    112997056 A * 6/2021 ........... B81B 3/0021
DE    102005059661 A1 * 6/2007 ......... G01L 19/0645
(Continued)

*Primary Examiner* — Andre J Allen
(74) *Attorney, Agent, or Firm* — Muncy, Geissler, Olds & Lowe, P.C.

(57)    ABSTRACT

A membrane device/membrane having a flexible membrane section. A first side of the membrane section is exposed to a process medium and a second side has a layer structure, which includes at least a first layer and a second layer. The first layer has a coefficient of thermal expansion, the value of which lies between the values of the coefficients of thermal expansion of the membrane section and the second layer. The second layer, with respect to the process medium or a component of the process medium has a permeability that is lower than the corresponding permeability of the membrane section. A pressure transmitter and a pressure sensor comprising such a membrane device is provided, as well as a use for a membrane device.

15 Claims, 2 Drawing Sheets

(58) Field of Classification Search

CPC ... G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 9/0005; G01L 9/0041; G01L 19/0061; G01L 9/0019; G01L 9/08; G01L 9/10; G01L 21/00; G01L 11/006; G01L 9/04; G01L 19/086; G01L 9/0008; G01L 1/18; G01L 9/00; G01L 11/004; G01L 19/069; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/126; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

| | | | | |
|---|---|---|---|---|
| 9,310,267 | B2 * | 4/2016 | Wagner | .................... G01F 1/34 |
| 10,514,311 | B2 | 12/2019 | Xiaoang et al. | |
| 2019/0126206 | A1 * | 5/2019 | Haydn | ................. B01D 69/108 |
| 2022/0112954 | A1 | 4/2022 | Sekimori | |

FOREIGN PATENT DOCUMENTS

| | | | |
|---|---|---|---|
| DE | 102007047707 | A1 | 4/2009 |
| DE | 102018130291 | A1 | 6/2020 |

* cited by examiner

FIG 4A
FIG 4B
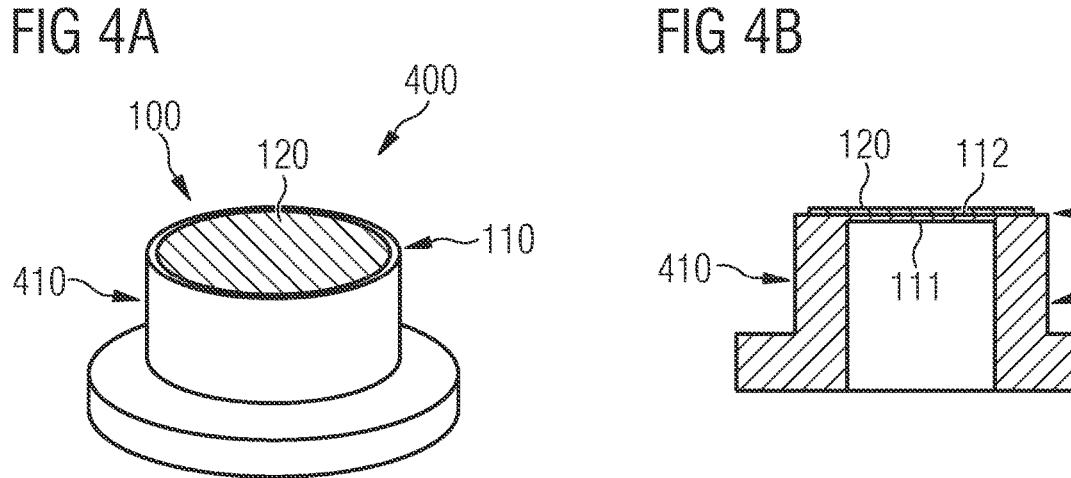
FIG 5
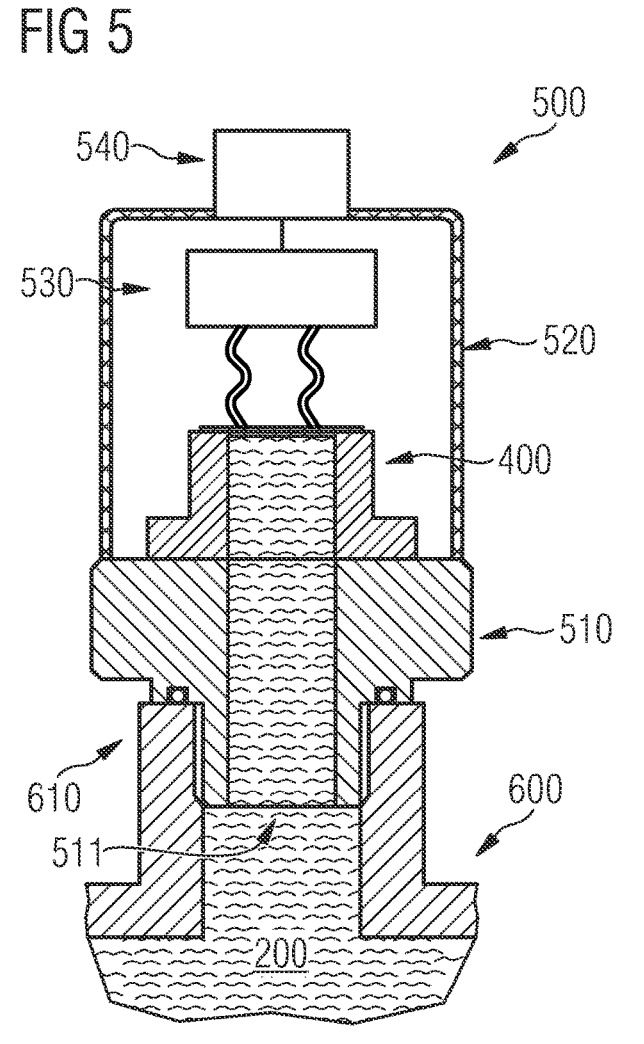

MEMBRANE DEVICE WITH LAYER STRUCTURE

This nonprovisional application claims priority under 35 U.S.C. § 119(a) to German Patent Application No. 10 2022 114 193.4, which was filed in Germany on Jun. 3, 2022, and which is herein incorporated by reference.

BACKGROUND OF THE INVENTION

Field of the Invention

The present invention relates to a membrane device with a layer structure applied to at least one section of the membrane.

Description of the Background Art

A layer structure generally refers to stacks or sequences of layers made of different materials, which can be produced, for example, by processes of thin-film technology or thick-film technology. Respective processes, such as physical or chemical vapor deposition, as well as other processes for processing respective layers, such as photolithography or laser trimming, are known from the conventional art.

The layer structure can be a thin-film layer structure. This is advantageous because the processes of thin-film technology allow for the features and examples explained in the following sections to be implemented in a particularly targeted manner.

Membrane sections on which a layer structure is applied or deposited can also be referred to as substrates in this context and in particular in the context of this document.

Membrane devices with a layer structure are used, for example, in the technical field of measurement technology. For example, a pressure measuring cell is known from DE 10 2007 047 707, which has a substrate on which an insulating layer is initially applied. The insulating layer is followed by a measuring layer with strip conductors, which lastly are at least partially covered by a passivation layer or protective layer. A flexible membrane section of the pressure measuring cell is the substrate, which is supported by a rigid edge section of the pressure measuring cell.

Such membrane devices are often used for pressure measurements in industrial process plants. In this process, one side of a flexible membrane section facing away from the layer structure is exposed to a process medium, such as a pressurized gas or liquid. Pressure changes in the process medium lead to varying degrees of deflection of the flexible membrane section. Stretches or compressions of the flexible membrane section caused by the deflection can be detected by stretch resistances that are integrated into the layer structure.

In particular, however, if the process medium contains volatile and/or reactive components, this can lead to impairments of the membrane or the measuring circuit in the layer structure.

SUMMARY OF THE INVENTION

It is therefore an object of the present invention to provide a membrane/membrane device which is less likely to react to impairments by a process medium and/or other environmental influences or is better protected from impairments by a process medium and/or other environmental influences. Likewise, the object of the invention is to specify a pressure sensor as well as a use for a membrane device by which these advantages are also achieved.

In an example of the present invention a membrane is provided having a flexible membrane section, wherein a first side of the membrane section is exposed to a process medium or is intended to be exposed to a process medium and wherein a second side of the membrane section has a layer structure. That is, a layer structure is applied, arranged, or embedded in the surface of this second side of the flexible membrane section. The first and second sides of the membrane section are opposite sides of the same. The flexible membrane section can also be referred to as a substrate on which the layer structure is arranged or applied, for example by means of a deposition process, as explained with regard to the state of the art.

The layer structure can include at least a first layer and a second layer. The first layer has a coefficient of thermal expansion, the value of which is between the values of the coefficients of thermal expansion of the membrane section and the second layer. The coefficient of thermal expansion—in practice sometimes referred to as the thermal expansion coefficient or just the coefficient of expansion—is a material parameter that describes how much a body made of a respective material expands when heated. Coefficients of thermal expansion are usually expressed in the unit $[K^{-1}]$. A high coefficient of thermal expansion can mean that the respective material expands strongly when heated or contracts strongly when cooled. If, for example, the second layer has a lower coefficient of thermal expansion than the material of the flexible membrane section, the first layer should have a coefficient of thermal expansion that is greater than that of the second layer, but at the same time less than that of the flexible membrane section.

The second layer has a permeability with respect to the process medium or at least one component of the process medium that is lower than the corresponding permeability of the membrane section to the same process medium or the same components of the process medium. Permeability is a material parameter that describes how permeable a body made of a particular material is to atoms or molecules of a certain gas or liquid, which have a concentration gradient or a pressure gradient with respect to two sides of the body (for example, in front of and behind the body). The substance, i.e., the gas or liquid, whose atoms or molecules permeate through the material (i.e., penetrate the material), is also referred to as permeate in this context; the process is also referred to as permeation. With regard to the permeation of material layers with a given thickness, it can be observed for most materials that the permeation decreases with increasing layer thickness but increases with increasing pressure or concentration difference of the permeate between the two sides of the layer. Furthermore, the permeability of a material can be temperature-dependent. In addition, the permeability can be different for different permeates, which is often referred to as selective permeability. Due to these numerous dependencies of permeability—which are sometimes also quantified by means of so-called permeability coefficients—they are indicated in practice in many different units, which usually depend on the method by which the material code was determined. Thus, absolute values may well differ depending on the source and a higher relevance should be attributed to the ratio of the values of different materials if the values were determined by the same method. In this document, the wording with regard to the atoms or molecules of the permeate is partly omitted and worded in a simplified way, for example, that the permeate permeates or penetrates the material or that a material or a layer has a certain permeability to a certain permeate. Thus, according to the present invention, if the material of the second layer is chosen in such a way that the permeability of the second layer with respect to the process medium or to a component of the process medium is less than that of the flexible membrane section, then this can mean that the atoms or molecules of the process medium or the component of the process medium can only permeate through the second layer more slowly or only to a lesser extent than through the flexible membrane section.

The first layer can be applied directly or indirectly to the membrane section and the second layer is applied directly or indirectly to the first layer. If one layer is directly applied to another, this means in the sense of this document that there is no further layer between the two. If a layer is indirectly applied to another layer, this in turn means in the sense of this document that other layers are arranged between the two layers.

The membrane structure according to the invention can advantageously achieve a high resistance to impairments by the process medium. A permeation of the process medium or the component of the process medium can be virtually prevented, at least significantly slowed down or controlled; furthermore, an uneven permeation over the surface of the flexible membrane section can be prevented or the permeation takes place at least considerably more uniformly on the surface of the flexible membrane section covered by the layer structure. In this way, locally varying degrees of impairment are avoided, which could otherwise impair the membrane structure in its durability or in other functions.

These advantages can be achieved because the invention combines several effects in an innovative way: by the given choice of the coefficient of thermal expansion of the first layer, it effectively acts as a buffer for thermal expansion effects between the flexible membrane section and the second layer. Mechanical stresses, which could otherwise occur between the flexible membrane section and the second layer due to their usually significantly different thermal expansion coefficients in the event of temperature changes, if the first layer were not arranged between them, are thus drastically reduced. Such mechanical stresses are also referred to as thermal stresses in the following. They are all the more pronounced, the greater the difference in the coefficients of thermal expansion of adjacent layers or materials. Due to the first layer, the total difference of the thermal expansion coefficients between the flexible membrane section and the second layer is virtually divided into two interfaces, each with a smaller difference and thus also lower thermal stresses. In combination with the chosen permeability of the second layer, this effect leads to a particularly effective reduction of impairments due to permeation of the process medium or a component of the process medium. By buffering thermal stresses by the first layer, the second layer can maintain a high quality in the long term, i.e., the second layer is not or at least significantly less affected by micro-cracks or other damage, which could otherwise occur due to thermal stresses in the long term or even in the course of the production of the layer structure. Otherwise, such micro-cracks or damage can lead to an uneven permeation over the surface of the layer structure. The first layer thus makes an essential contribution to ensuring that the second layer can bring out its low permeability evenly over the entire surface of the layer structure.

The permeability of the second layer or a sublayer encompassed by the second layer with respect to the process medium or a component of the process medium can be less than the corresponding permeability of the membrane section by at least a factor of 100, preferably by at least a factor of 1000, and more preferably by at least a factor of $10^6$. Due to this design, a barrier effect of the second layer against permeation can be achieved particularly effectively.

When the first layer or the second layer is mentioned in this document, what is meant is at least one homogeneous layer formed of a concrete material. If, on the other hand, as in the previous section and in subsequent sections, one or more sublayers of the first layer or the second layer are mentioned, then this refers to one or more layers of a layer stack of different materials. Thus, in such exemplary embodiments, the first layer or the second layer may each comprise a stack of different sublayers, wherein each sublayer always meets all the requirements that a single first layer or second layer must also meet.

The first layer or a sublayer encompassed by the first layer has a structural constant whose value lies between the values of the same structural constant of the membrane section and the second layer. In particular, this structural constant can be a lattice constant of the deposited layers or an average atomic distance within the layers. Thus, the second layer can effectively prevent or at least drastically reduce mechanical stresses that can otherwise occur between the flexible membrane section and the second layer due to unequal structural constants. Such mechanical stresses do not only occur due to different expansion behavior when the temperature changes, but generally arise at boundary layers when adjacent layers or materials have different structural constants. Therefore, these mechanical stresses are also referred to as intrinsic stresses in the following. Analogous to the mode of action of the first layer as a buffer layer for thermal stresses described above, the first layer in this embodiment can also act as a buffer for intrinsic stresses and thus exclude another cause of micro-cracks and other damage or at least significantly reduce its effect.

The first layer or a sublayer encompassed by the first layer can have a permeability with respect to the process medium or a component of the process medium that is lower than the corresponding permeability of the membrane section. As a result, the first layer or a corresponding sublayer of the first layer can already develop a barrier effect, i.e., effectively prevent or at least significantly delay permeation of the process medium or a component of the process medium. As a result, the second layer can be protected even more effectively and the membrane structure can be further improved in terms of its durability and other functions.

The permeability of the first layer or a sublayer encompassed by the first layer with respect to the process medium or a component of the process medium may be less than the corresponding permeability of the membrane section and/or less than the corresponding permeability of the second layer by at least a factor of 100, preferably by at least a factor of 1000, and more preferably by at least a factor of $10^6$. Due to this design, a barrier effect of the first layer against permeation can be achieved particularly effectively.

The first layer or a sublayer encompassed by the first layer can have a permeability with respect to the process medium or a component of the process medium which is higher than the corresponding permeability of the membrane section. As a result, an increased, accelerated penetration of the first layer can be achieved, so that in the application, when the first side of the membrane section is exposed to the process medium, after a certain time there is substantially a homogeneous, uniform penetration of the first layer with atoms or molecules of the process medium or a component of the process medium. This, in turn, leads to a more uniform permeation in or through the second layer. Thus, an uneven, i.e., locally varying degree of permeation or impairment of the second layer by the process medium or a component of the process medium can be effectively prevented or at least significantly reduced. This improves the durability and other functions of the entire membrane device, and in particular of the second layer.

The permeability of the first layer or a sublayer encompassed by the first layer with respect to the process medium or a component of the process medium can be greater than the corresponding permeability of the membrane section and/or the corresponding permeability of the second layer by at least a factor of 100, preferably by at least a factor of 1000, more preferably by at least a factor of $10^6$. With this design, the more uniform permeation described in the previous section can be particularly effectively achieved.

The first layer or a sublayer encompassed by the first layer can be an adhesion promoter layer. An adhesion promoter layer is characterized in that it is arranged between two layers of different materials and develops a stable adhesion effect on both layers, i.e., at the respective interfaces to the two adjacent layers. For example, the adhesion promoter layer is arranged directly on the flexible membrane section and can thus contribute in an advantageous manner to ensuring that further sublayers of the first layer or the following second layer adhere stably to each other and thus ultimately stably to the flexible membrane section. Damage to the layer structure, such as peeling of individual layers, can thus be effectively prevented or reduced.

The first layer can comprise at least two sublayers whose coefficients of thermal expansion are different, but both lie between the values of the coefficients of thermal expansion of the membrane section and the second layer. The sublayers are applied to the membrane section in such a sequential manner that the sublayer that comes closest to the second side of the membrane section differs the least from that of the membrane section in its coefficient of thermal expansion, and each subsequent sublayer differs more from the membrane section in its coefficient of thermal expansion than the previous one. This design can further improve the buffering effect with regard to thermal stresses between the membrane section and the second layer by means of the first layer. Here, the total difference of the thermal expansion coefficients between flexible membrane section and second layer is divided into an even larger number (as compared to embodiments with only one single-ply first layer) of intermediate steps or intermediate interfaces, and thus the respective differences in the coefficients of thermal expansion and thus also the thermal stresses can be reduced even further on the individual interfaces between the sublayers of the first layer and the second layer.

The first layer can have a thickness between 10 nm and 5000 nm. Such a layer thickness can be used to achieve the effects and advantages described in previous sections, which can occur in connection with the first layer, particularly effectively.

The second layer or a sublayer encompassed by the second layer can have an electrical resistance greater than 10 MOhms, in particular greater than 100 MOhms (MOhms means 1,000,000 Ohms). The electrical resistance of the second layer or a sublayer encompassed by the second layer refers to a resistance between a lower side of the respective layer, which points in the direction of the first layer, and an upper side of the respective layer, which is turned away from the first layer. Such a second layer or sublayer of the second layer can also be called an insulation layer. This insulation layer can advantageously electrically insulate further layers following the second layer, such as a strip conductor layer, from any, possibly conductive, layers underneath it or from the flexible membrane section. For example, an insulation layer can be formed from $SiO_2$, which also has a very low permeability to volatile substances such as hydrogen.

A strip conductor layer can be applied directly or indirectly to the second layer, which is formed as an insulation layer or comprises an insulation layer. As a result, the membrane device can advantageously acquire further functions. For example, the strip conductor layer can be used to create a measuring bridge that converts local strains or stretches of the surface of the flexible membrane section into measurable electrical quantities. This allows for the membrane device to be used as a sensing element for pressure measurements when the first side of the membrane device is exposed to a pressurized process medium and becomes elastically deformed.

In such an application, the properties of the membrane device can be exploited particularly advantageously: The buffer effect of the first layer with regard to thermal stress and, if necessary, also against intrinsic stresses, which have already been discussed in previous sections with regard to various embodiments of the membrane device, first reduce the sensitivity of a sensing element formed by the membrane device in general to environmental influences, such as temperature fluctuations. As a result, such a sensing element can achieve higher reliability, stability and measurement accuracy.

In addition, the combination of the first and second layers, can achieve a very effective barrier effect against the permeation of the process medium or a component of the process medium, or at least significantly reduce the permeation. Furthermore or alternatively, a locally uneven permeation can be reduced, i.e., the second layer and the strip conductor layer arranged above it are permeated more evenly. Thus, impairments of the strip conductor layer arranged above the second layer by permeation effects can be significantly reduced and a sensing element formed by the membrane structure can achieve significantly better long-term stability and measurement accuracy.

The first layer can have a thickness between 10 nm and 500 nm, in particular a thickness between 20 nm and 200 nm. By means of such a thickness, as already explained in a further preceding exemplary embodiment with an even greater layer thickness region, the effects and advantages described in previous sections, which can occur in relation to the first layer, can be achieved particularly effectively. In addition, the layer thickness region more narrowly defined here can produce further advantageous properties, which appear only in connection with the strip conductor layer: As previously explained, so-called laser trimming is known in the prior art. In the context of this document, this method is used to manipulate strip conductors of the strip conductor layer. If, for example, a Wheatstone measuring bridge is formed in the strip conductor layer by interconnecting resistance tracks, laser trimming can be used to precisely adjust the resistance value of individual resistance tracks by inserting co-called trim cuts into the resistance tracks by means of laser radiation. In this method, part of the laser radiation usually also hits the layers under the strip conductor layer. Materials that can be used as a permeation barrier layer and insulating layer for the second later are usually transparent to the laser radiation, which is especially true for $SiO_2$ (silicon dioxide). Thus, part of the laser radiation hits the underlying first layer. If this has a layer thickness according to this development, it can be effectively prevented that the first layer is heated by the laser radiation and damaged as a result of strong heating. Instead, the heat introduced by the laser radiation can be effectively dissipated to the substrate under the first later, i.e., to the membrane section. The membrane section thus acts as a heat sink. If, on the other hand, the first layer is too thick, the heat cannot dissipate quickly enough and damage to the first layer occurs. If in turn the first layer is too thin, the desired effects of the first layer, in particular an effective reduction of thermal and/or intrinsic stresses, cannot be achieved to a sufficient extent.

A protective layer can be applied directly or indirectly to the strip conductor layer and covers it at least in sections. As a result, the strip conductor layer can be effectively protected from damage. Individual surface sections can be exempted from the protective layer, for example, to make contact surfaces accessible for electrical contacting of the conductor path layer. The protective layer can be a varnish or a passivation layer, which is applied over the strip conductor layer, for example, using thin-film technology.

The process medium can be hydrogen, in particular gaseous hydrogen. This element is an important component of numerous industrial processes. Membrane devices, as they are known from the prior art, can be adversely affected by the permeation of hydrogen, in particular by locally uneven permeation. For example, if such membrane devices form a sensing element, the measurement circuit of this sensing element, which is formed by a strip conductor layer, can be detuned or altered by the permeation effects, so that measurement accuracy and signal stability may be jeopardized in the long term. According to this exemplary design of the membrane device, the second layer has a permeability to hydrogen molecules that is lower than the corresponding permeability of the flexible membrane section. In combination with the first layer, which effectively reduces various forms of undesirable mechanical stress in the second layer (e.g., thermal stresses and/or intrinsic stresses) and thus counteracts the formation of micro-cracks and other damage, the second layer can optimally develop its barrier effect against the permeation of hydrogen.

The material of which the second layer or a sublayer encompassed by the second layer is formed of, can be described by the formula $Al_xSi_y$ (O, N)$_{1-x-y}$, wherein x and y are atomic fractions between 0 and 1 and are always less than or equal to 1 in sum. Si, Al, O and N stand for the chemical elements silicon, aluminum, oxygen and nitrogen. The notation (O, N) in this formula means that either oxygen or nitrogen is part of the compound. The material corresponding to this formula, or this group of materials, has a very low permeability as compared to many other substances and is therefore particularly well suited to be used for the second layer of the membrane device. In applications where the process medium is hydrogen or hydrogen is the component of the process medium that is to be prevented from permeation by the layer structure, silicon dioxide ($SiO_2$), for example, can be used particularly advantageously, as it has a low permeability as compared to hydrogen and at the same time is already very well established in thin-film technology and can therefore be used cost-effectively.

The material from which the flexible membrane section is made can be a stainless steel, in particular an austenitic steel, or a special alloy, in particular Elgiloy, Hasteloy, 316L or 1.4404. These materials are characterized by high mechanical and/or chemical resistance and can therefore be advantageously used for membrane devices whose first side comes into contact with process media that have a high temperature and/or a high pressure or are chemically and/or mechanically abrasive.

The material of which the first layer, or at least a sublayer encompassed by the first layer, can be defined by the formula $M_xN_yO_zC_{1-x-y-z}$, wherein x, y, and z are atomic fractions between 0 and 1, which in sum are always less than or equal to 1. The signs N, O and C stand for the chemical elements nitrogen, oxygen and carbon. The symbol M stands for elements aluminum (Al), chromium (Cr), titanium (Ti), molybdenum (Mo), tungsten (W), hafnium (Hf), or zirconium (Zr). The material group defined in this way is particularly suitable for use as a first layer, as it can at least meet the condition regarding the coefficients of thermal expansion for a large number of material combinations of membrane section and second layer. This is especially true if the respective material of the flexible membrane section and the second layer is selected from the aforementioned material groups. A corresponding selection can be made with the help of literature values or on the basis of experimental determinations.

Alternatively, the material of which the first layer, or at least a sublayer encompassed by the first layer, is composed may be one of the metals with the chemical element symbol Be, Sc, Ti, V, Cr, Fe, Ge, Zr, Nb, Mo, Ru, Rh, Pd, Ce, Pr, Nd, Pm, Gd, Tb, Dy, Ho, Lu, Hf, Ta, W, Re, Os, Ir, Pt or Th, or be an iron-carbon alloy, a nickel-based alloy, a stainless steel, a titanium alloy or Kovar, or one of the materials with the chemical bond formulas Si3N4, SiC, TiN, TiC, AlN, Al2O3, ZrO2, BaTiO3, Cr2O3, TiAlN or ZrN. These materials are also particularly well suited as a first layer, as they can at least meet the condition regarding the thermal expansion coefficients for a large number of material combinations of membrane section and second layer. This is especially true if the respective material of the flexible membrane section and the second layer is selected from the above-mentioned material groups. A corresponding selection can be made with the help of literature values or on the basis of experimental determinations. The use of titanium or titanium nitride is particularly preferred, as this material is also suitable, for example, as an adhesion promoter layer, especially when using the special alloys mentioned above for the flexible membrane section.

A further aspect of the invention relates to a pressure transmitter, which comprises a membrane device according to the first aspect of the present invention or one of the exemplary embodiments or further developments of the membrane device mentioned above.

A further aspect of the invention relates to a pressure sensor comprising a membrane device according to the present invention. Preferably, the membrane device of the pressure sensor comprises a flexible membrane section formed of a stainless steel or a special alloy, a first layer formed of titanium or titanium nitride and a second layer formed of silicon dioxide. By such a choice of material, the advantages of the invention and its exemplary embodiments discussed in previous sections can be realized particularly effectively, while at the same time the layer structure can be produced cost-effectively and efficiently by processes of thin-film technology. Furthermore, the pressure sensor comprises a strip conductor layer, which is arranged directly or indirectly on the second layer. This can form a measuring bridge that converts local strains or stretches of the surface of the flexible membrane section into measurable electrical quantities. Due to the layer structure, this strip conductor layer can be effectively protected from impairments due to impairments due to permeation of the process medium or at least one component of the process medium. This pressure sensor, especially with the above-mentioned exemplary material combination, can be particularly advantageous for use in conjunction with the process medium hydrogen or a hydrogen-containing process medium and prevent or at least greatly reduce the permeation of hydrogen due to the layer structure.

Accordingly, a further aspect of the present invention also includes the use of a membrane device according to the invention, a pressure transmitter and/or a pressure sensor according to the invention mentioned with or for a process medium which is hydrogen or contains hydrogen. When used in such hydrogen applications, the effects, impact and advantages of the various aspects, embodiments and further developments of the invention can be used particularly effectively.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4A is a perspective representation of a pressure sensor with a membrane device;

FIG. 4B shows a pressure sensor with a membrane device in a cross-sectional view; and FIG. 5 shows, schematically, a cross-section of a pressure gauge with a pressure sensor.

DETAILED DESCRIPTION

Figure 1:
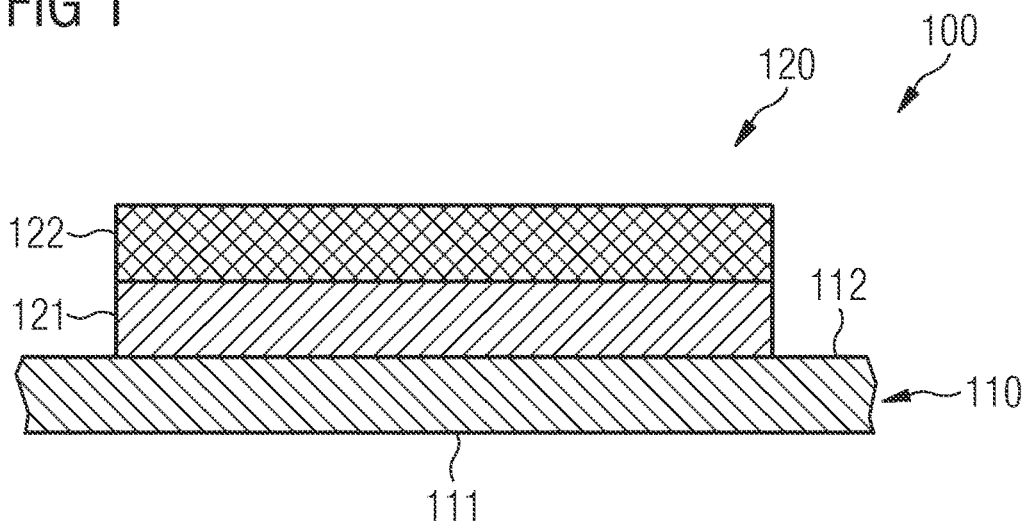
FIGS. 1 and 2 show, schematically, cross-sections of a membrane device.
Figure 2:
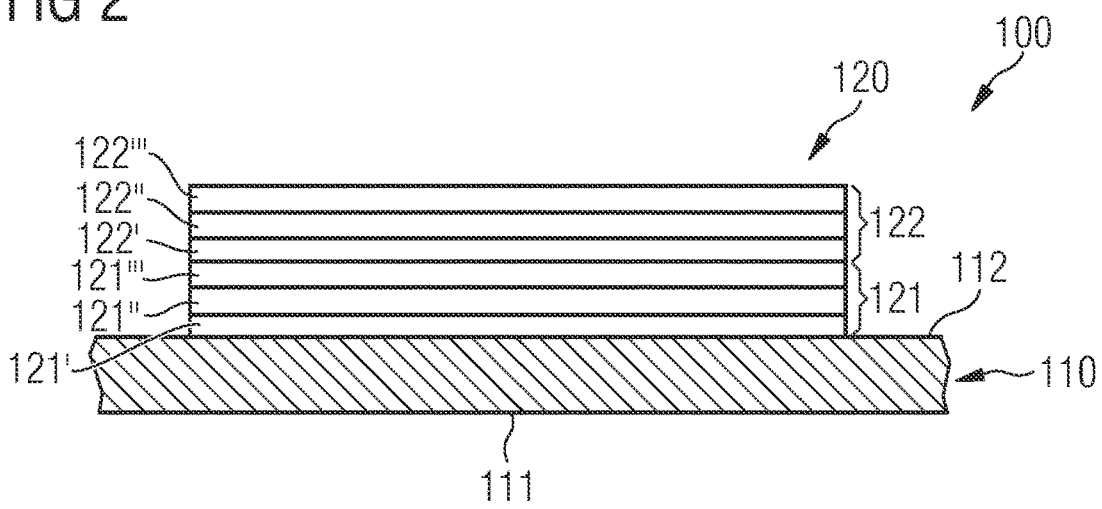

FIGS. 1 and 2 show a membrane device 100 with a flexible membrane section 110 shown in detail. On a second side 112 of the membrane section 110, a layer structure 120 with a first layer 121 and a second layer 122 is arranged. A first side 111 of the membrane section 110 may be exposed to a process medium 200 in an unspecified manner.

In FIG. 2, the first layer 121 and the second layer 122 each comprise several sublayers 121', 121", 121''', 122', 122", 122'''.

Figure 3:
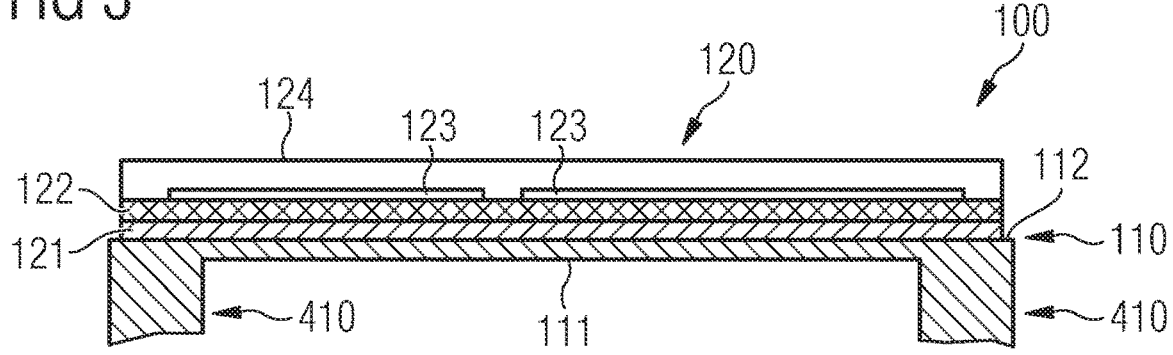
FIG. 3 shows a pressure sensor with a membrane device in a cross-sectional view.

FIGS. 3, 4A, and 4B each show a pressure sensor 400, which comprises a membrane device 100. The pressure sensor 400 is designed in the form of a pressure measuring capsule. A solid, rigid edge section 410 in the form of a hollow cylinder carries the flexible membrane section 110.

FIG. 3 shows the layer structure 120 in more detail in a cross-section. A strip conductor layer 123 is applied to the second layer 122, and a protective layer 124 is applied on top of it.

FIG. 5 schematically shows a cross-section of a pressure gauge 500. It comprises a connector 510 and a gauge housing 520. The pressure gauge 500 is connected to a measuring port 610 of a process plant 600 via the connector 510, for example via a threaded connection. The connector 510 has an access port 511 through which a process medium 200 from the process plant 600 is fed to a pressure sensor 400. The pressure sensor 400 can be designed according to FIGS. 4A and 4B. It comprises a flexible membrane section 110 with a layer structure 120, wherein the layer structure 120 is formed, for example, according to the embodiment of FIG. 3. In a strip conductor layer 123 of the layer structure 120, a measuring bridge with piezoresistive resistance tracks is formed, which enables a metrological detection of a deformation of the membrane section 120, which results from the fact that the process medium 200 is in contact with the first side 111 of the membrane section 120. The strip conductor layer 123 is connected by schematically indicated lines, for example by so-called bond wires, to a schematically represented evaluation electronics 530 of the pressure gauge 500, which measures the electrical properties of the measuring bridge and derives a measured value therefrom, in particular a pressure of the process medium 200. A measured value signal representing this measured value is provided via a communication interface 540, for example via a plug socket with electric contact, or as a radio signal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A membrane comprising:

a flexible membrane section having a first side and a second side, the first side of the membrane section being adapted to be exposed to a process medium or is intended to be exposed to a process medium, the second side of the membrane section comprising a layer structure that comprises at least a first layer and a second layer, wherein the first layer having a coefficient of thermal expansion whose value lies between values of the coefficients of thermal expansion of the membrane section and the second layer, wherein the second layer, with respect to the process medium or a component of the process medium, has a permeability which is less than a corresponding permeability of the membrane section, wherein the first layer is directly or indirectly applied to the membrane section, and wherein the second layer is directly or indirectly applied to the first layer.

2. The membrane according to claim 1, wherein the permeability of the second layer or a sublayer encompassed by the second layer, with respect to the process medium or a component of the process medium, is lower than the corresponding permeability of the membrane section by at least a factor of 100, or by at least a factor of 1000, or by at least a factor of $10^6$.

3. The membrane according to claim 1, wherein the first layer or a sublayer encompassed by the first layer has a structural constant whose value lies between values of a same structural constant of a membrane segment and the second layer, and wherein this structural constant is a lattice constant or average interatomic spacing.

4. The membrane according to claim 1, wherein the first layer or a sublayer encompassed by the first layer has a permeability with respect to the process medium or a component of the process medium which is less than a corresponding permeability of the membrane section, wherein the permeability of the first layer or of the sublayer encompassed by the first layer, with respect to the process medium or a component of the process mediums, is less than the corresponding permeability of the membrane section and/or the corresponding permeability of the second layer by at least a factor of 100, or by at least a factor of 1000, or by a factor of at least $10^6$.

5. The membrane according to claim 1, wherein the first layer or a sublayer encompassed by the first layer has a permeability with respect to the process medium or a component of the process medium which is greater than the corresponding permeability of the membrane section, wherein the permeability of the first layer or of the sublayer comprising the first layer with respect to the process medium or a component of the process medium is greater than the corresponding permeability of the membrane section and/or the corresponding permeability of the second layer by at least a factor of 100, or by at least a factor of 1000, or by at least a factor of $10^6$.

6. The membrane according to claim 1, wherein the first layer comprises at least two sublayers whose coefficients of thermal expansion are between the values of the coefficients of thermal expansion of the membrane section and the second layer, and wherein the sublayers are applied successively to the membrane section such that the sublayer, which comes closest to the second side of the membrane section, differs the least from the membrane section in its coefficient of thermal expansion, and each subsequent sublayer differs more in its coefficient of thermal expansion from the membrane section than the previous one.

7. The membrane according to claim 1, wherein the first layer has a thickness between 10 nm and 5000 nm, or between 10 nm and 500 nm, or between 20 nm and 200 nm.

8. The membrane according to claim 1, wherein the second layer or a sublayer encompassed by the second layer has an electrical resistance greater than 10 MOhms, or greater than 100 MOhms.

9. The membrane according to claim 1, further comprising:
   a strip conductor layer that is directly or indirectly applied to the second layer; and
   a protective layer that is applied directly or indirectly to the strip conductor layer and covers it at least in sections.

10. The membrane according to claim 1, wherein the process medium or the component of the process medium is hydrogen.

11. The membrane according to claim 1, wherein the material which the second layer or a sublayer encompassed by the second layer is composed by the formula $Al_xSi_y$ (O, N)$_{1-x-y}$, wherein x and y are atomic fractions between 0 and 1 and in sum are always less than or equal to 1,
   Si is silicon,
   Al is aluminum,
   O is oxygen, and
   N is nitrogen.

12. The membrane according to claim 1, wherein the membrane section is formed of:
   a stainless steel,
   an austenitic steel,
   a special alloy, or
   Elgiloy, Hasteloy, 316L or 1.4404.

13. The membrane according to claim 1, wherein the material which the first layer or a sublayer encompassed by the first layer is composed by the formula $M_xN_yO_zC_{1-x-y-z}$, wherein
   x, y, and z are atomic fractions between 0 and 1, which in sum are always less than or equal to 1,
   N is nitrogen,
   O is oxygen,
   C is carbon, and
   M is one of the following elements: Al, Cr, Ti, Mo, W, Hf, or Zr,
and/or
   wherein the material which the first layer or a sublayer encompassed by the first layer is formed of:
   is one of the metals Be, Sc, Ti, V, Cr, Fe, Ge, Zr, Nb, Mo, Ru, Rh, Pd, Ce, Pr, Nd, Pm, Gd, Tb, Dy, Ho, Lu, Hf, Ta, W, Re, Os, Ir, Pt or Th, or
   is a Fe—C alloy, a Ni-based alloy, a stainless steel, a Ti alloy or Kovar, or
   is Si3N4, SiC, TiN, TiC, AlN, Al2O3, ZrO2, BaTiO3, Cr2O3, TiAlN or ZrN.

14. A pressure sensor comprising:
   a rigid section; and
   the membrane according to claim 1,
   wherein an upper end of the rigid section supports the membrane, and
   wherein the rigid section accommodates the process medium therein, such that the first side of the membrane is exposed to the process medium.

15. The membrane according to claim 1, wherein the membrane is for a process medium composed of hydrogen or a hydrogen-containing process medium, wherein the second layer and/or first layer has a permeability with respect to hydrogen which is lower than the corresponding permeability of the membrane section.

* * * * *